United States Patent   (10) Patent No.: US 7,859,751 B2
Knittel                   (45) Date of Patent:     Dec. 28, 2010

(54) COMPACT APPARATUS FOR READING FROM AND/OR WRITING TO HOLOGRAPHIC STORAGE MEDIA

(75) Inventor: Joachim Knittel, Tuttlingen (DE)

(73) Assignee: Thomson Licensing, Boulogne-Billancourt (FR)

( * ) Notice: Subject to any disclaimer, the term of this patent is extended or adjusted under 35 U.S.C. 154(b) by 339 days.

(21) Appl. No.: 11/903,120

(22) Filed: Sep. 20, 2007

(65) Prior Publication Data

US 2008/0084599 A1    Apr. 10, 2008

(30) Foreign Application Priority Data

Oct. 4, 2006    (EP) .................................. 06121731

(51) Int. Cl.
*G02B 5/30*    (2006.01)
(52) U.S. Cl. ................ 359/489; 359/501; 359/253; 359/35; 349/193
(58) Field of Classification Search ............... 359/489; 349/194
See application file for complete search history.

(56) References Cited

U.S. PATENT DOCUMENTS

| 6,111,842 | A | 8/2000 | Nishino |
| 6,137,764 | A | 10/2000 | Tsuchiya |
| 6,191,829 | B1 * | 2/2001 | Hashimoto ................... 349/17 |
| 7,010,211 | B2 * | 3/2006 | Cohen ........................ 385/140 |

FOREIGN PATENT DOCUMENTS

EP    1551011 A    7/2005

OTHER PUBLICATIONS

Search Report Dated Apr. 3, 2007.

* cited by examiner

*Primary Examiner*—Amel C Lavarias
(74) *Attorney, Agent, or Firm*—Robert D. Shedd; Joseph J. Opalach; Jerome G. Schaefer

(57) ABSTRACT

A compact apparatus for reading from and/or writing to holographic storage media and polarizing filter for use in such an apparatus includes a substrate with an outer zone and an inner zone, the outer zone and the inner zone having different optical properties for a first direction of polarization and a second direction of polarization, and a wave plate attached to the substrate for influencing the polarization of the a light beam, wherein a part of the wave plate corresponding to either the outer zone or the inner zone is switchable.

11 Claims, 3 Drawing Sheets

COMPACT APPARATUS FOR READING FROM AND/OR WRITING TO HOLOGRAPHIC STORAGE MEDIA

This application claims the benefit, under 35 U.S.C. §119, of European Patent Application No. 06121731.1 on 4 Oct. 2006.

FIELD OF THE INVENTION

The present invention relates to a compact apparatus for reading from and/or writing to holographic storage media, and to a filter for use in such an apparatus.

BACKGROUND OF THE INVENTION

In holographic data storage digital data are stored by recording the interference pattern produced by the superposition of two coherent laser beams, where one beam, the so-called 'signal beam', is modulated by a spatial light modulator and carries the information to be recorded. The second beam serves as a reference beam. The interference pattern leads to modifications of specific properties of the storage material, which depend on the local intensity of the interference pattern. Reading of a recorded hologram is performed by illuminating the hologram with the reference beam using the same conditions as during recording. This results in the reconstruction of the recorded signal beam.

One advantage of holographic data storage is an increased data capacity. Contrary to conventional optical storage media, the volume of the holographic storage medium is used for storing information, not just a single or few 2-dimensional layers. One further advantage of holographic data storage is the possibility to store multiple data in the same volume, e.g. by changing the angle between the two beams or by using shift multiplexing, etc. Furthermore, instead of storing single bits, data are stored as data pages. Typically a data page consists of a matrix of light-dark-patterns, i.e. a two dimensional binary array or an array of grey values, which code multiple bits. This allows to achieve increased data rates in addition to the increased storage density. The data page is imprinted onto the signal beam by the spatial light modulator (SLM) and detected with a detector array.

SUMMARY OF THE INVENTION

It is an object of the invention to propose an optical element that allows to realize a compact apparatus for reading from and/or writing to a holographic storage medium, and an apparatus for reading from and/or writing to a holographic storage medium using such optical element.

According to the invention, this object is achieved by a polarizing filter for a light beam, having:
- a substrate with an outer zone and an inner zone, the outer zone and the inner zone having different optical properties for a first direction of polarization and a second direction of polarization, and
- a wave plate attached to the substrate for influencing the polarization of the light beam, wherein a part of the wave plate corresponding to either the outer zone or the inner zone is switchable.

The wave plate is switchable between a state in which it influences the polarization and a state in which is does not influence the polarization. Alternatively, it is switchable between two or more states in which it influences the polarization in different ways. The polarizing filter can be regarded as a polarization sensitive pinhole and functions simultaneously as a Fourier filter and a beam-combiner. The filter is advantageously used in an apparatus for reading from and/or writing to holographic storage media. The filter is arranged in a Fourier plane of the apparatus and allows to efficiently combine signal and reference beam during recording, and to separate the reference beam and the reconstructed signal beam during readout.

The polarizing filter either is a transmission type filter or a reflection type filter. In the case of a transmission type filter the outer zone has a low transmissivity for the first direction of polarization and a high transmissivity for the second direction of polarization, whereas the inner zone has a high transmissivity for the first direction of polarization and a low transmissivity for the second direction of polarization. The switchable wave plate in this case is a half wave plate. The transmission type filter has the advantage that it can be easily integrated in the optical path of an apparatus for reading from and/or writing to holographic storage media. When the filter is a reflection type filter, the outer zone has a low reflectivity for the first direction of polarization and a high reflectivity for the second direction of polarization, and the inner zone has a high reflectivity for the first direction of polarization and a low reflectivity for the second direction of polarization. In this case the switchable wave plate is a quarter wave plate. The reflection type filter has the advantage that the polarization-dependent reflectivity can easily be realized with coatings.

Preferably, a part of the wave plate corresponding to the inner zone is either a hole or is not switchable. Alternatively, only the part of the wave plate corresponding to the inner zone is switchable, whereas a part corresponding to the outer zone is not switchable or omitted. Advantageously, the wave plate is realized as a liquid crystal element. In this way the wave plate is inexpensive and easy to manufacture.

The outer zone and the inner zone preferably have sub-wavelength gratings. Such gratings exhibit a very strong polarization dependence. They hence allow to realize the polarization dependent properties in an efficient way.

Advantageously, the sub-wavelength gratings are designed such that the non-transmitted or non-reflected light is refracted at an angle sufficiently large to avoid stray light in the optical system, e.g. an angle of 10° or more. This means that the non-transmitted or non-reflected light is refracted into other diffraction orders than the zeroth order. The avoidance of stray light improves the contrast of the recorded holograms and the contrast of the reconstructed object beams. Of course, the chosen angle depends on the optical setup used in an apparatus for reading from and/or writing to a holographic storage medium.

According to a further aspect of the invention, an apparatus for reading from and/or writing to a holographic storage medium has
- a 4f-system for imaging a signal beam and/or a reference beam into the holographic storage medium, and
- a polarizing Fourier filter according to the invention for separating a reconstructed signal beam and the reference beam. The apparatus requires only a single 4f-imaging system and can hence be realized in a very compact way. The polarizing filter, which is located in the Fourier plane of the 4f-system, still allows a reliable separation of the reference beam and a reconstructed signal beam.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention. In the figures.

DETAILED DESCRIPTION OF PREFERRED EMBODIMENTS

Figure 1:
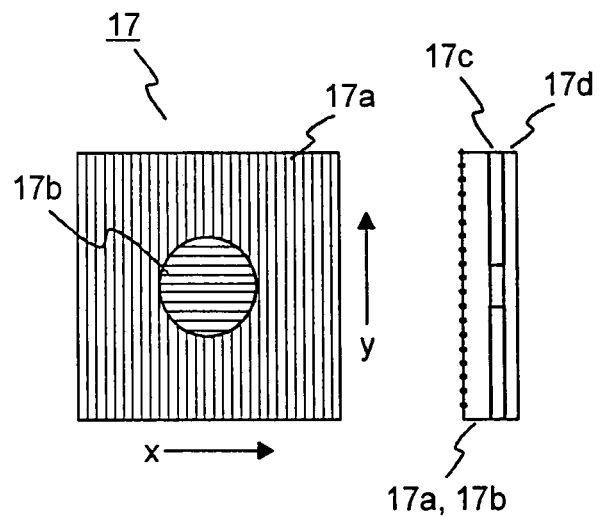
FIG. 1 shows a transmission type polarizing pinhole Fourier filter according to the invention, FIG. 2 schematically depicts an holographic storage apparatus during writing.

In FIG. 1 a polarizing pinhole Fourier filter according to the invention is shown. It is one of the principal components of the proposed system. The polarizing pinhole Fourier filter 17 consists of a transparent substrate with two different zones 17a, 17b. In the outer zone 17a the transmission is 0 for a polarization in a first direction, e.g. the x-direction, and 1 for a polarization in a second direction, e.g. the y-direction. In the circular central zone (aperture) 17b the transmission is 1 for a polarization in the first direction and 0 for a polarization in the second direction. Of course, the dependence of the transmission on the direction of polarization of the outer zone 17a and the inner zone 17b can likewise be reversed. The zones 17a, 17b can for example be manufactured with the help of sub-wavelength gratings, which show a very strong polarization dependence. Preferably, the sub-wavelength gratings are designed in such a way that the non-transmitted radiation is deflected by a sufficiently large angle, such that the deflected light does not pass through the aperture of any of the following components of the optical path. In the above example the first direction of polarization is perpendicular to the second direction of polarization. In an alternative embodiment the two directions of polarization are right and left circular polarization.

The polarizing pinhole Fourier filter 17 further has an electrically controlled half wave plate (λ/2 plate) 17c, which is attached to the substrate and covered by a cover layer 17d. The electrically controlled half wave plate 17c is preferably formed by a liquid crystal element. The half wave plate 17c in FIG. 1 is designed in such a way that the central part, which corresponds to the inner zone 17b, is a hole. According to an alternative solution the central part of the half wave plate 17c is not influenced by the applied electric field, i.e. it is not switchable. In both cases the polarization state of light passing through the inner zone 17b is not influenced by the electrically controlled half wave plate 17c. As a further alternative it is likewise possible to place a switchable zone in the inner zone 17b, whereas the outer part of the half wave plate 17c is not switchable.

Figure 2:
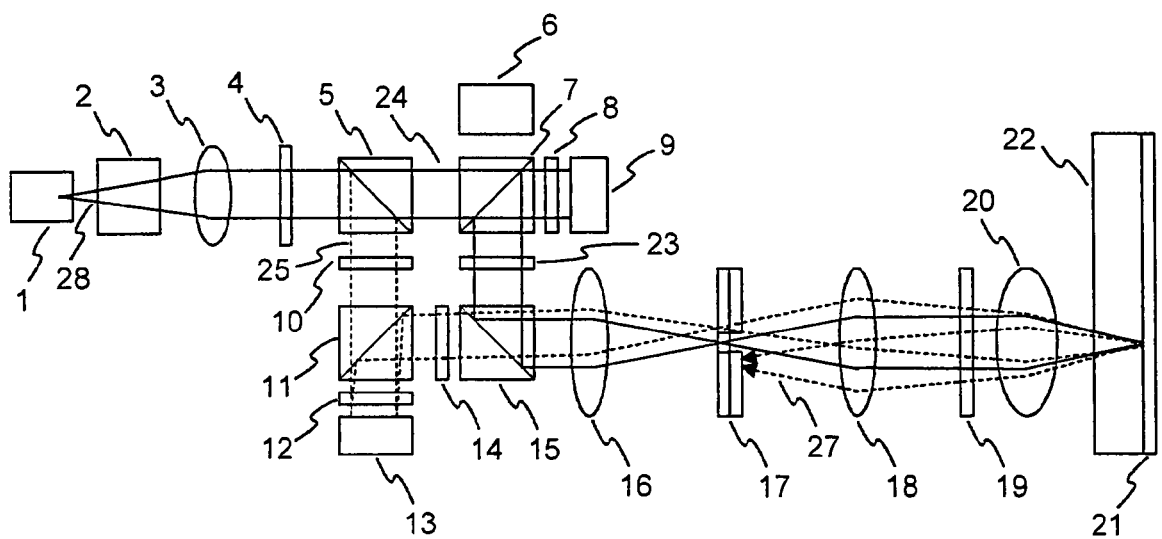

An apparatus for reading from and/or writing to a holographic storage medium is schematically depicted in FIG. 2. A light beam 28 emitted by a laser 1 is shaped by a beam-shaper 2, if necessary, and collimated by a collimator lens 3. A first polarizing beam-splitter (PBS) 5 splits an incoming light 28 beam into a reference beam 25 and a signal beam 24. A rotatable half wave plate 4 located before the first polarizing beam-splitter (PBS) 5 is used to set the intensity ratio of the reference beam 25 and the signal beam 24. The direction of polarization of the reference beam 25 is rotated by a second half wave plate 10. The reference beam 25 passes a second polarizing beam-splitter 11 before being sent onto a spatial light modulator 13. The spatial light modulator 13 allows to realize different multiplexing techniques and preferably consists of at least a phase modulator, which has a plurality of pixels, e.g. 256×256 or more pixels, and introduces a phase shift of $\pi/2$ into the reflected beam. A first quarter wave plate (λ/4 plate) 12 is provided between the second polarizing beam-splitter 11 and the spatial light modulator 13. After having passed the first quarter wave plate 12 twice, the reference beam 25 is reflected by the second polarizing beam-splitter 11 towards a third half wave plate 14 and a third polarizing beam-splitter 15. A lens pair 16, 18 forms a so-called 4-f imaging system. The polarizing Fourier filter 17 of FIG. 1, is situated in the Fourier plane between the two lenses 16 and 18. The spatial light modulator 13 modifies the reference beam 25 in such way that separate foci are generated at the position of the polarizing Fourier filter 17, e.g. by generating multiple partial reference beams. In the simplest case the spatial light modulator 13 is a diffractive element. In this case only shift-multiplexing is employed. The filter 17 blocks the 0-order components of the reference beam 25 and transmits only the higher order components. The polarization direction of the transmitted components can be rotated by 90° with the integrated electrically controlled half wave plate 17c, depending on whether a hologram is being recorded or read. Finally, the reference beam 25 is sent though a second quarter wave plate 19 and focused with an objective lens 20 into a holographic storage medium 22.

The light transmitted through the first polarizing beam-splitter 5 represents the signal beam 24. The signal beam 24 continues through a fourth polarizing beam-splitter 7 and impinges on a reflective amplitude modulator (or spatial light modulator, SLM) 9. Again, the optical setup can easily be modified in such way that a transmission type SLM 9 may be used. A third quarter wave plate 8 ensures that the reflected signal beam is deviated by the fourth polarizing beam-splitter 7 towards a switchable fourth half wave plate 23. The signal beam 24 is then deviated by the third polarizing beam-splitter 15 and imaged by the lens pair 16, 18 into the pupil of the objective lens 20. The signal beam 24 is then focused into the holographic storage medium 22 after passing the second quarter wave plate 19. The signal beam is low-pass Fourier filtered by the polarizing Fourier filter 17.

In the following the recording process shall be explained. For recording a hologram the SLM 9 transfers the data to be recorded onto the signal beam 24. The signal beam 24 is low-pass filtered by the polarizing Fourier filter 17, passed through the optional second quarter wave plate 19 and focused into the holographic medium 22. In the medium the signal beam 24 has a circular polarization. The wave front of the reference beam 25 is set by the phase and amplitude SLM 13. Then the reference beam 25, whose direction of polarization is orthogonal to the one of the signal beam 24, is high-pass filtered by the polarizing Fourier filter 17. The electrically controlled half wave plate 17c of the filter 17 is switched off, i.e. it does not modify the direction of polarization of the signal beam 24. The optional second quarter wave plate 19 converts the polarization of the reference beam 25 into circular polarization. The polarization direction is opposite to the one of the signal beam 24. Therefore, the only interfering rays responsible for the generation of the hologram are the combinations of the reflected signal beam 24 and the incoming signal beam 24 and the incoming signal beam 24 and the reflected reference beam 27. The reflection takes place at a reflective layer 21 of the holographic storage medium 22.

Advantageously, an amplitude modulator is also integrated into the spatial light modulator 13. As any wave front is uniquely determined by its spatial amplitude and phase distribution in a single plane, a combination of a phase and an amplitude modulator permits a maximum number of multiplexing states. Furthermore, with the amplitude modulator it is possible to generate halve cone reference beams by switching off the light in halve of the aperture of the objective lens 20. This is possible, as the modulator 13 and the pupil plane of the objective lens 20 lie in conjugate planes that are formed by the lenses 16 and 18.

Figure 3:
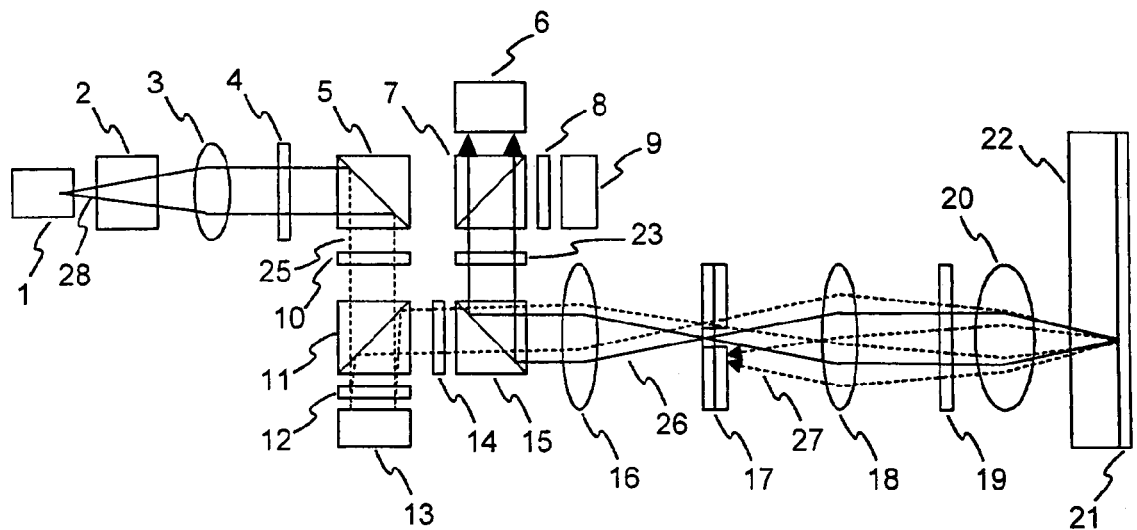
FIG. 3 depicts the same apparatus during reading.

The readout process is shown in FIG. 3. The identical reference beam 25 as the one used during the recording process is generated by the SLM 13. Again, the reference beam 25 is high-pass filtered by the polarizing Fourier filter 17. However, this time the electrically controlled half wave plate 17c is switched on, so that the polarization is rotated by 90°. The beam is sent through the second quarter wave plate 19 into the holographic storage medium 22. This means that the circular polarization direction is opposite to the circular polarization direction used during the recording process. Consequently, the circular polarization direction of the reproduced signal beam 26 is also inversed. After passing through the second quarter wave plate 19, the polarization of the reproduced signal beam 26 is linear in a direction that permits the passage through the polarizing Fourier filter 17. The beam 26 is deviated by the third polarizing beam-splitter 15 and passed through the switchable fourth half wave plate 23, which is set in a state that permits the reproduced signal beam 26 to pass through the fourth polarizing beam-splitter 7. Finally, the reproduced signal beam 26 is imaged onto an array detector 6. The reflected reference beam 27 is blocked by the polarizing Fourier filter 17. It is likewise possible to write to the holographic storage medium 22 with the electrically controlled half wave plate 17c being switched on. In this case it has to be switched off during reading.

In this exemplary setup the distance from the array detector 6, the SLM 13, and the SLM 9 to the lens 16 corresponds to the focal length of the lens 16. Otherwise, the polarizing Fourier filter 17 does not work correctly.

It is also possible to operate the system without the second quarter wave plate 19. In this case the electrically controlled half wave plate 17c of the polarizing Fourier filter 17 is switched on during recording and during read-out, so that the directions of polarization of the reference beam 25 and the signal beam 24 are parallel. This means that in such an alternative embodiment the electrically controlled half wave plate 17c is replaced by a non-switchable half wave plate.

Figure 4:
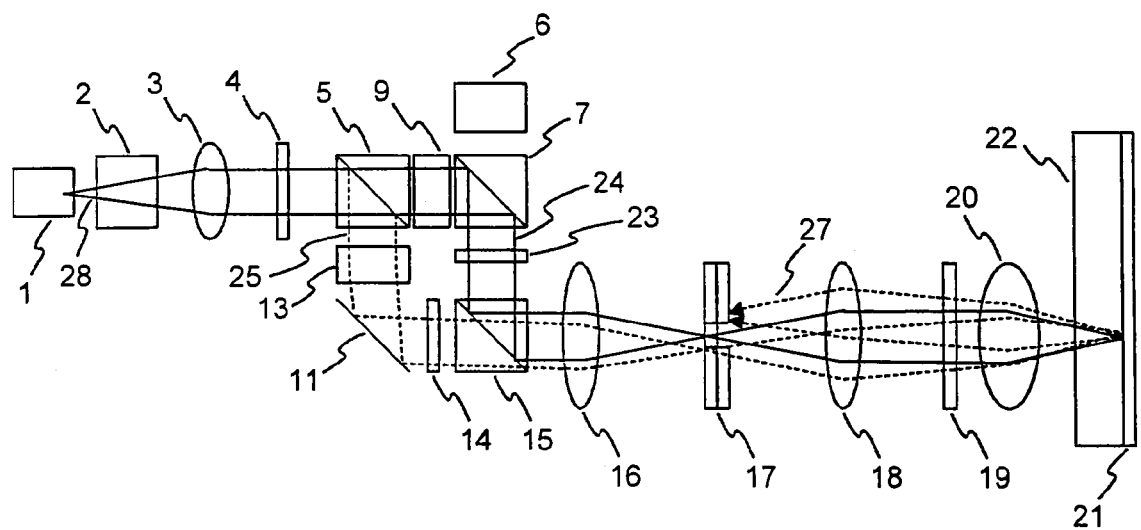
FIG. 4 depicts a modified optical setup, in which transmission type SLMs are used.

FIG. 4 depicts a modified optical setup, in which transmission type SLMs 9, 13 are used instead of reflective SLMs. Though reflective SLMs allow a fast switching, this modified optical setup has the advantage that the first quarter wave plate 12 and the third quarter wave plate 8 are no longer needed. The fourth PBS 11 is replaced by a mirror.

Figure 5:
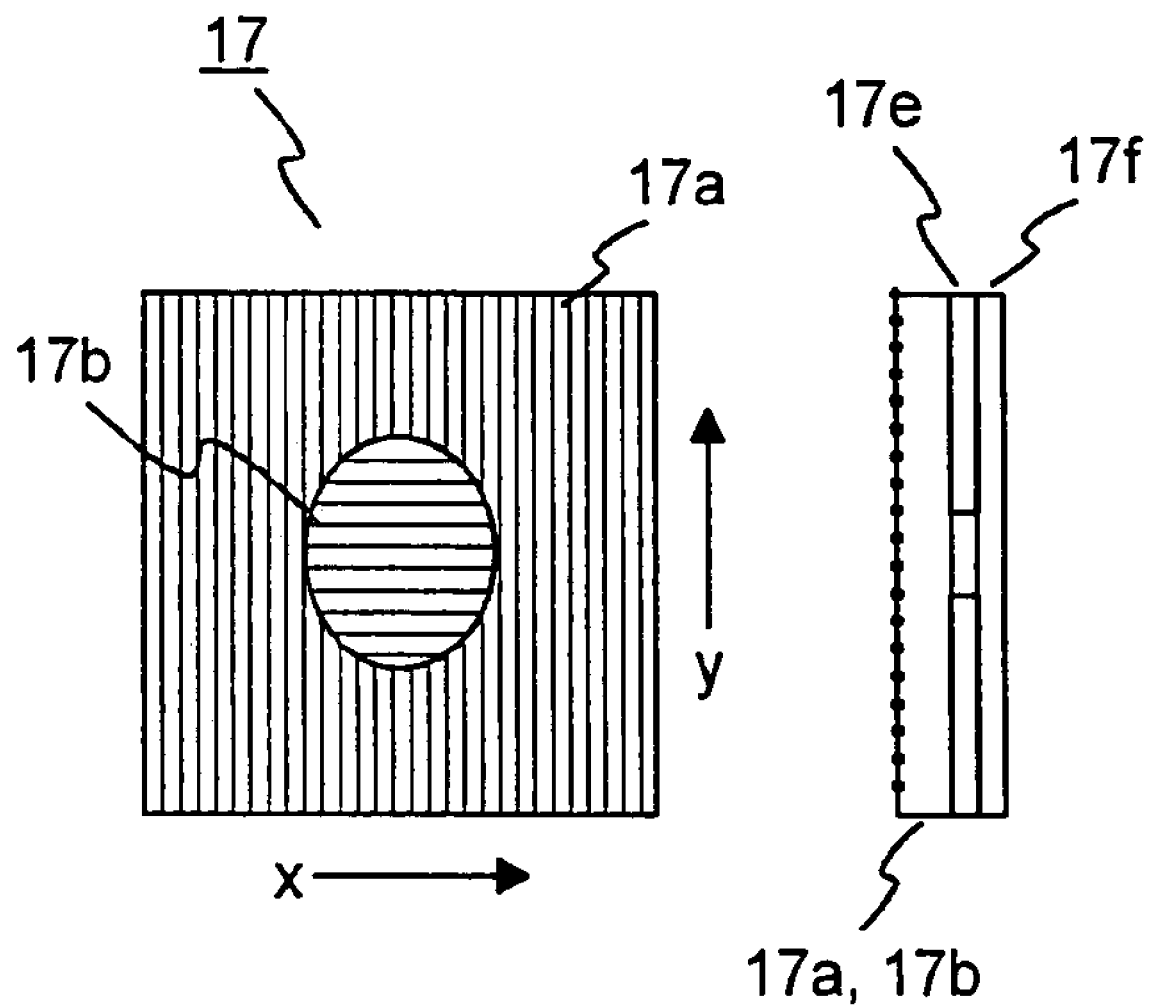
FIG. 5 shows a reflection type polarizing pinhole Fourier filter according to the invention.

As an alternative to the transmission type polarizing Fourier filter 17, also a reflection type polarizing Fourier filter can be realized. This is depicted in FIG. 5. In this case the polarizing Fourier filter 17 is slightly inclined with respect to the optical axis, in order to enable a separation of the reflected light beams from the incoming light beams 25, 26. As a consequence, the inner zone 17b has an elliptical shape. In addition, the electrically controlled half wave plate 17c is replaced by an electrically controlled quarter wave plate 17e. For reflecting the light beams 25, 26 the polarizing Fourier filter 17 is provided with a mirror layer 17f. In FIG. 5, the mirror layer 17f replaces the cover layer 17d. It may of course also be arranged on the cover layer 17d.

Of course, some of the optical components used in the above described embodiments may be replaced by other components with corresponding functions, or may even be omitted in some configurations.

What is claimed is:

1. A polarizing filter for a light beam, having:
   a substrate with circular or elliptical inner zone and an outer zone surrounding said inner zone, the outer zone and the inner zone having different optical properties for a first direction of polarization and a second direction of polarization, and
   a wave plate attached to the substrate for influencing the polarization of the light beam, wherein a first part of the wave plate corresponding to either the outer zone or the inner zone is switchable, whereas a second part of the wave plate corresponding to a respective other zone is not switchable.

2. The polarizing filter according to claim 1, wherein the outer zone has a low reflectivity for a first direction of polarization and a high reflectivity for a second direction of polarization, and the inner zone has a high reflectivity for the first direction of polarization and a low reflectivity for the second direction of polarization, and wherein the wave plate is a quarter wave plate.

3. The polarizing filter according to claim 1, wherein the outer zone has a low transmissivity for a first direction of polarization and a high transmissivity for a second direction of polarization, and the inner zone has a high transmissivity for the first direction of polarization and a low transmissivity for the second direction of polarization, and wherein the wave plate is a half wave plate.

4. The polarizing filter according to claim 1, wherein a part of the wave plate corresponding to the inner zone is either a hole or is not switchable, or wherein only a part of the wave plate corresponding to the inner zone is switchable, whereas the part corresponding to the outer zone is not switchable or omitted.

5. The polarizing filter according to claim 1, wherein the wave plate is a liquid crystal element.

6. The polarizing filter according to claim 1, wherein the outer zone and the inner zone have sub-wavelength gratings.

7. The polarizing filter according to claim 6, wherein the subwavelength gratings are designed such that the non-transmitted or non-reflected light is refracted at an angle sufficiently large to avoid stray light in the optical system.

8. The polarizing filter according to claim 7, wherein the angle is at least 10°.

9. Apparatus for reading from and/or writing to a holographic storage medium, having
   a 4f-system for imaging a signal beam and/or a reference beam into the holographic storage medium, and
   a polarizing filter according to claim 1 for separating a reconstructed signal beam and the reference beam.

10. The apparatus according to claim 9, wherein the polarizing filter is located in the Fourier plane of the 4f-system.

11. The apparatus according to claim 9, wherein the polarizing filter has a wave plate that is not switchable.

* * * * *